United States Patent
Kaihatsu et al.

(10) Patent No.: US 7,898,138 B2
(45) Date of Patent: Mar. 1, 2011

(54) ROTARY ELECTRIC MACHINE

(75) Inventors: Keiichiro Kaihatsu, Kamagaya (JP); Takeshi Obata, Narashino (JP); Kenichi Saito, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 569 days.

(21) Appl. No.: 11/838,265

(22) Filed: Aug. 14, 2007

(65) Prior Publication Data

US 2008/0136269 A1    Jun. 12, 2008

(30) Foreign Application Priority Data

Dec. 6, 2006    (JP)    ............... 2006-328936

(51) Int. Cl.
*H02K 17/00* (2006.01)

(52) U.S. Cl. ...................................... 310/211

(58) Field of Classification Search ............. 310/211, 310/213
See application file for complete search history.

(56) References Cited

U.S. PATENT DOCUMENTS

| | | | | |
|---|---|---|---|---|
| 3,826,940 A | * | 7/1974 | McKean et al. | 310/211 |
| 6,147,423 A | * | 11/2000 | Byrd | 310/89 |
| 2004/0113508 A1 | | 6/2004 | Yasuhara et al. | |
| 2005/0134137 A1 | * | 6/2005 | Sweo | 310/211 |

FOREIGN PATENT DOCUMENTS

| | | | |
|---|---|---|---|
| JP | 07-39123 | * | 2/1995 |
| JP | 2000-60045 | * | 2/2000 |
| JP | 2002-291211 | | 10/2002 |
| JP | 2004-236456 | | 8/2004 |
| JP | 2005-211971 | | 8/2005 |
| WO | WO 02/056446 | | 7/2002 |

\* cited by examiner

*Primary Examiner*—Nguyen N Hanh
(74) *Attorney, Agent, or Firm*—Antonelli, Terry, Stout & Kraus, LLP.

(57) ABSTRACT

In a rotary electric machine, for enhancing the reliability and reducing the size thereof, the rotary electric machine comprises a stator, and a rotor opposed to the stator and adapted to be rotated around a shaft, the rotor having an iron core formed therein with a plurality of axial holes formed in the iron core, a plurality of conductor bars inserted respectively in the holes, and end rings provided at the end parts of the conductor bars, wherein the outer peripheral parts of the end rings are electrically and mechanically joined to the conductor bars through friction stir welding, and the one end part of the conductor bar is axially projected from the end ring. With this configuration, it is possible to enhance the capability of heat radiation from the rotary electric machine and to enhance the design freedom of component parts around the stator and the rotor.

9 Claims, 7 Drawing Sheets

ROTARY ELECTRIC MACHINE

INCORPORATION BY REFERENCE

The present application claims priority from Japanese application JP2006-328936 filed on Dec. 6, 2006, the content of which is hereby incorporated by reference into this application.

FIELD OF THE INVENTION

The present invention relates to a rotary electric machine.

DESCRIPTION OF RELATED ART

There has been known a rotary electric machine, such as an induction motor, having a rotor with an iron core which incorporates conductor bars connected to end rings, as disclosed in WO02/056446 and JP-A-2004-236456. These publications disclose such a structure that conductor bars are inserted through an iron core composed of thin electromagnetic steel sheets laminated one upon another, and are secured by end rings, that is, the conductor bars and the end rings are electrically and mechanically jointed together through friction stir welding.

It has been known that the conventional die-casting has caused a defect such as a blow hole in a component, e.g. a conductor bar or an end ring, which hinders a current from running therethrough, and accordingly, which would cause affection upon the characteristics of a rotary electric machine.

In view of the above-mentioned fact, WO02/056446 discloses the application of friction stir welding for improving the above-mentioned affection.

By the way, the end ring would be provided with an impeller, so called as an internal fan, for agitating the atmosphere within a rotary electric machine through the rotation of the rotor, and as well, be provided with seats and protrusions which are adapted to mount balance weights for improving a dynamic balance of the rotor.

The internal fan, and the seats and the protrusions for mounting the balance weights, as stated above, may have various shapes according to specifications of products. Further, there would be possibly anticipated occurrence of a limitation to the shapes and a problem as to a design freedom in the case of the friction stir welding of the end rings. In the case of joining a conductor bar to an end ring by pressing a joint tool in the extending direction of the conductor bar, as disclosed WO02/056446, there would be caused such disadvantages that the attachment of the internal fan and the balance weights would become difficult, or those having desired shapes cannot be attached.

JP-A-2004-236456 discloses, as an example, a rotary tool as a joint tool which is pressed against the outer peripheral surface of an end ring so as to press the end ring toward the inner diameter thereof for joining the conductor bars. In this case, the freedom of a shape of a member to be attached to the end ring becomes enhanced, that is, for example, a plurality of fins may be formed on the outer surface of the end ring, thereby it is possible to enhance the heat radiation from the end ring and the rotor. However, in the configuration disclosed in JP-A-2004-236456, the size and the shape of the fins is affected by the environment around the fins, and accordingly, the effect of heat radiation by the fins is subjected to the limitation by the environment around the fins. Thus, it is required to improve the environment therearound in order to enhance the above-mentioned effect.

Thus, in order to reduce the size of the apparatus or to enhance the reliability thereof, it is required to aim at further enhancing the freedom of shapes and heat radiation.

BRIEF SUMMARY OF THE INVENTION

The present invention has been devised in view of the above-mentioned tasks, and accordingly, an object of the present invention is to provide a rotary electric machine which has a smaller size and which can enhance its reliability.

To the end, according to an aspect of the present invention, there is provided a rotary electric machine comprising a stator, a rotor arranged being opposed to the stator and adapted to be rotated around its axis, the rotor being composed of an iron core, a plurality of conductor bars inserted respectively in a plurality of holes which are formed in the iron core in the axial direction thereof, and end rings provided to opposite end parts of the conductor bars, wherein friction stir welding is carried out over an entire circumference of the outer peripheral parts of the end rings to form a friction stir weld with the conductor bars, and the conductor bars are electrically and mechanically jointed to the end rings by the friction stir weld, which extends over an entire cross sectional area of the conductor bars, and one end part of the conductor bars is projected from the associated end ring in the axial direction.

There are preferably provided, according to the present invention, the following specific forms:

(1) An internal fan for agitating the atmosphere in the rotary machine through rotation of the rotor may be provided to the end ring;

(2) Seats and protrusions for attaching balance weights which improve a dynamic balance of the rotor may be provided to the end rings or the projected parts of the bar conductors;

(3) The projected part of each conductor bar may be joined through friction stir welding over the entire sectional area thereof;

(4) The conductor bars or the end rings may be made of aluminum or aluminum alloy;

(5) The conductor bars or the end rings may be made of copper or copper alloy;

(6) The conductor bars may be provided thereover with an insulation film;

(7) The projected height of the conductor bars from the iron core may be equal to or lower than the height of a stator coil wound around the stator; and (8) The shape of one end part of each conductor bar projected from each end ring may be larger than that of the associated hole.

Further, in the above-mentioned specific form (8) of the present invention, the conductor bars are preferably composed, in combination, of those which are inserted in the iron core from one end side of the latter and those which are inserted therein from the other side, and it is desired that the parts of the conductor bars which are larger than the above-mentioned holes are present on both sides of the iron core.

According to the present invention, there may be provided a rotary machine which is smaller than the conventional one and which has reliability higher than that of the conventional one.

Other objects, features and advantages of the invention will become apparent from the following description of the embodiments of the invention taken in conjunction with the accompanying drawings.

DETAILED DESCRIPTION OF THE INVENTION

Explanation will be hereinbelow made of embodiments of the present invention with reference to the accompanying drawings.

Figure 1:
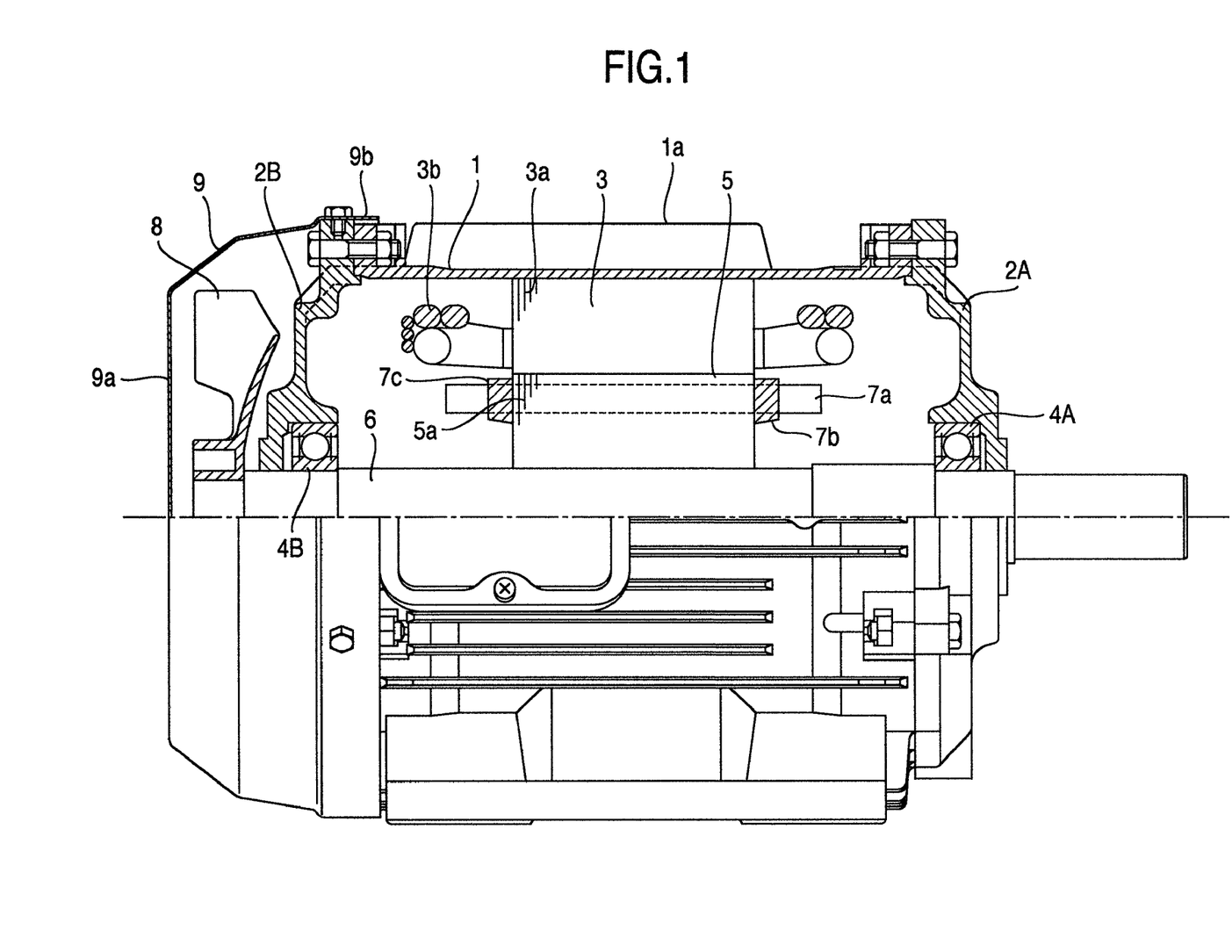
FIG. 1 is a view illustrating a configuration of a rotary electric machine according to an embodiment of the present invention.

At first, referring to FIG. 1 which is a view illustrating a configuration of a rotary electric machine in an embodiment of the present invention, explanation will be hereinbelow made of an entire configuration of a rotary electric machine according to this embodiment of the present invention. It is noted in this figure that the upper half part of this rotary electric machine is longitudinal sectioned so as to show the internal configuration thereof.

A housing 1 which is made of cast iron, aluminum, a steel sheet or the like has a substantially cylindrical shape so as to constitute an outer sheath of the rotary electric machine. The housing 1 is usually provided at its outer periphery with radiation fins 1a in order to enhance its cooling performance. End brackets 2A, 2B are attached in openings on opposite sides of the housing 1, respectively, through spigot fitting.

A stator 3 is composed of a stator iron core 3a and a stator coil 3b. The stator 3 is fitted and fixed in the inner peripheral part of the housing 1. The stator iron core 3a is composed of a plurality of thin plates such as silicon steel plates, which are laminated one upon another. This stator iron core 3a is fitted and fixed in the inner peripheral part of the housing 1. Further, the stator coil 3a is wound around slot parts formed in the iron core 3a.

A rotor 5 is composed of a laminated iron core 5a, conductor bars 7a and end rings 7b, 7c. The configuration of the rotor 5 in this embodiment, will be explained later in detail with reference to FIG. 2. The rotor 5 is attached at a position opposed to the stator 3 around the outer peripheral part of the rotary shaft 6.

In the above-mentioned configuration, when an a.c. voltage is fed to the stator 3, current runs through the conductor bars 7a of the rotor 5, and therefore, the rotor 5 is rotated through the inter action between magnetic flux caused by the current running through the conductor bars 7a, and a current running through the stator coil 3b. Further, the rotation of the rotor 5 causes a rotary shaft 6 to rotate. The rotary shaft 6 is rotatably journalled at its opposite ends to the end brackets 2A, 2B through the intermediary of bearings 4A, 4B. Further, one end part of the rotary shaft 6 is inserted through the end bracket 2A so as to project externally from the housing 1, that is, the projecting part of the rotary shaft 6 serves as an output shaft for external transmission of the rotation.

The other end part of the rotary shaft 6 which is inserted through the end bracket 2B, is mounted thereto with an external cooling fan (external fan) 8. The external fan 8 is covered thereover with an end cover 9 which are formed therein with openings 9a through which the inside and the outside of the rotary electric machine are communicated with each other. Thus, when the rotor 4 is rotated, the external fan 8 is rotated so as to take outside air into the rotary electric machine through the openings 9a. In this embodiment, the openings 9a are formed in the side surface part of the end cover 9, which is opposed to the external fan 8 so as to facilitate the flow of the air between the inside and outside of the end cover 9.

The end cover 9 is attached at its peripheral edge to the end bracket 2B and/or the outer diametrical part of the housing 1. In this embodiment, the peripheral edge end part of the end cover 9 is attached so as to define a radial gap 9b between the end bracket 2B and the outer diametrical part of the housing 1. The gap 9b serves as an opening which communicates between the outside and the insider of the end cover 9, for functioning as an air discharge port in this embodiment.

Figure 2:
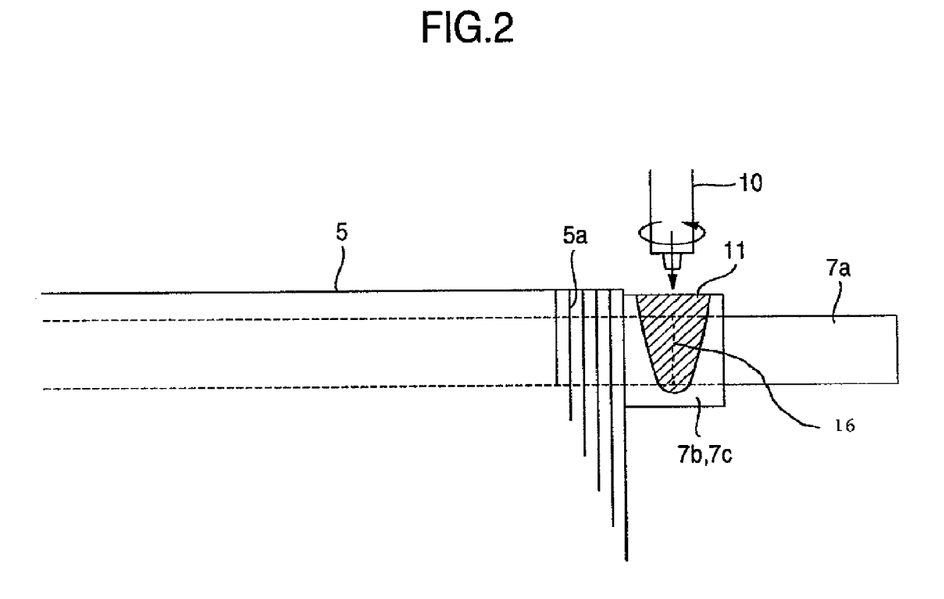
FIG. 2 is a side view illustrating the configuration of a rotor utilizing friction stir welding in the embodiment shown in FIG. 1.
Figure 3:
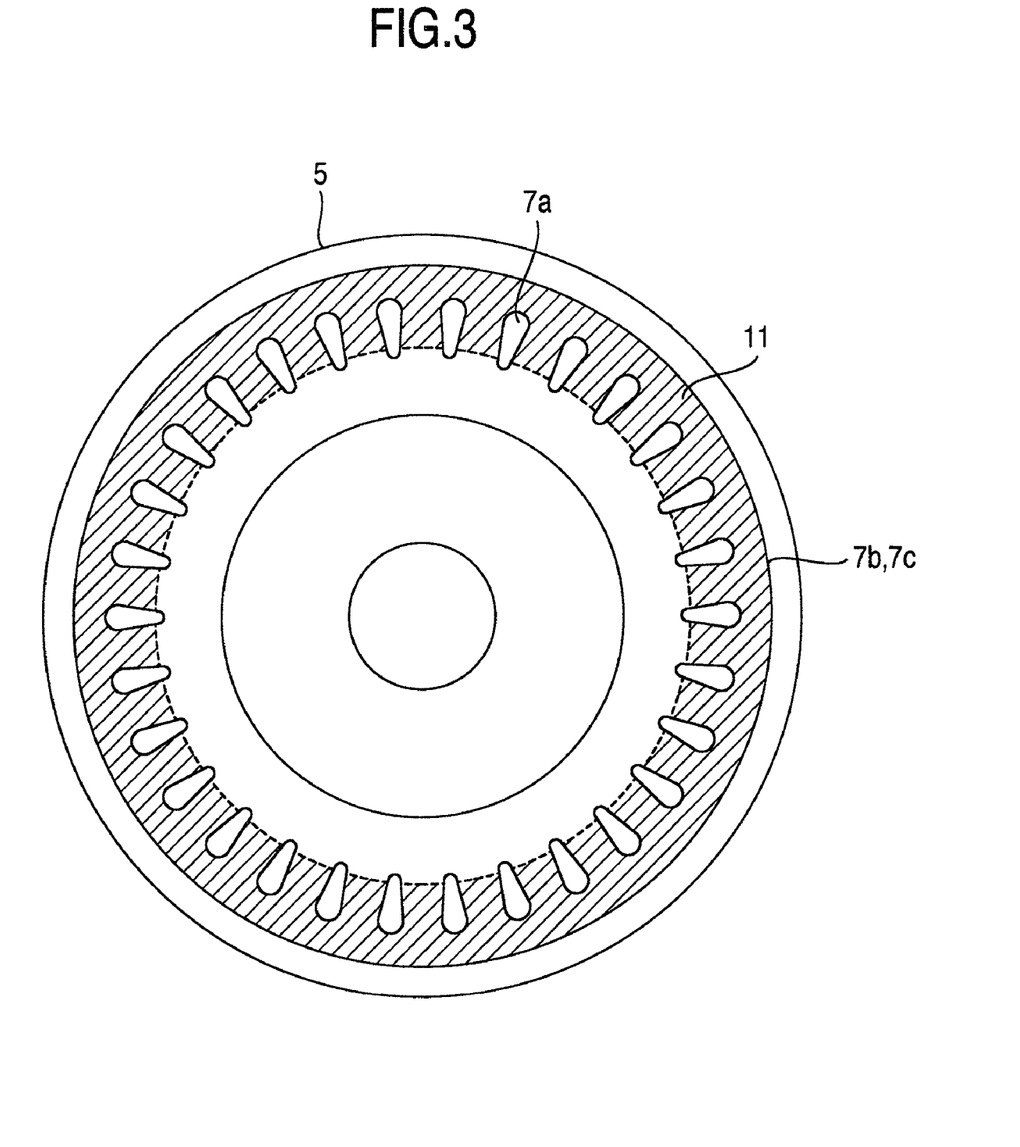
FIG. 3 is a front view illustrating the configuration of the rotor which is jointed with the use of friction stir welding as shown in FIG. 2.

Explanation will be hereinbelow made of the configuration of the rotor 5 in this embodiment with reference to FIGS. 2 and 3. FIG. 2 is a side view which shows the configuration of the rotor using friction stir welding in such a situation that a conductor bar 7a is joined with the use of a joint tool. FIG. 3 is a front view which shows the configuration of the rotor which is joined utilizing the friction stir welding, as shown in FIG. 2, and in which the rotor 5 is viewed in the direction of the rotary shaft of the rotor 5.

As stated above, the rotor 5 is composed of the laminated iron core 5a, the conductor bars 7a and the end rings 7b, 7c. The conductor bars 7a are formed so as to have a shape corresponding to the shape of slots formed in the rotor 5, by extrusion molding, cold drawing or the like. The laminated iron core 5a is formed therein with holes into which the conductor bars 7a are inserted so that the conductor bars 7a are projected from the laminated iron core 5a on opposite sides in the direction of the insertion thereof. The end ring 7b or 7c has a size corresponding to the characteristics which can be stratified by the rotary electric machine, and is formed therein with grooves or holes in which the conductor bars 7a are inserted, the end rings 7b and 7c being formed by extrusion molding, drawing, cutting, or die-casting which is excellent in castability. Further, after the conductor bars 7a are inserted in the laminated iron core 5a, the end rings 7b, 7c are attached to the projected parts of the conductor bars 7a on the opposite sides of the rotor 5.

It is noted that the conductor bars 7a and the end rings 7b, 7c are made of aluminum or aluminum alloy, or copper or copper alloy. If they are made of copper or copper alloy, the resistance thereof becomes lower, thereby it is possible to reduce the loss to a small value in order to aim at enhancing the efficiency of the rotary electric machine. However, those made of copper or copper alloy are expensive in comparison with those made of aluminum or aluminum alloy. Thus, the material from which they are formed is selectively used in accordance with their use.

In this embodiment, the friction stir welding is carried out in the outer peripheral part of the end ring 7b or 7c. Specifically, as shown in FIG. 2, the joint tool 10 is pressed against the outer peripheral part of the end ring 7b or 7c in a direction toward the center of the end ring while it is rotated at a high speed. Then, the joint tool 10 is further inserted so that a joint part 11 is extended across an entire cross sectional area 16 of the conductor bar 7a. After the depth of insertion of the joint tool 10 is determined, the rotor 5 is rotated about its center axis. Thus, the joint part 11 is formed being extended over the entire circumference of the end ring 7b or 7c, and accordingly, the conductor bars 7a and the end ring 7b or 7c are electrically and mechanically joined to one another over the entire cross-sectional area 16 of the part where the conductor bars 7a are projected from the laminated iron core 5a. It is, of course, possible to rotate the joint tool 10 along the periphery of the end ring 7b or 7c while rotor 5 is fixed, in order to join the end ring 7b or 7c to the conductor bars 7a.

Thus, in this embodiment, since the joint tool 10 for carrying out the friction stir welding is inserted from the outer periphery of the end ring 7b or 7c toward the central direction, no restriction is present as to the end face of the end ring 7b or 7c. Thus, the conductor bars 7a can penetrate not only the laminated iron core 5 but also the end ring 7b or 7c so as to project outward from the end face of the end ring 7b or 7c.

Since a current runs through the conductor bars 7a during operation of the rotary electric machine, the conductor bars 7a generate heat due to their resistance. That is, they serve as heating elements during operation of the rotary electric machine, and accordingly, the rotary electric machine requires a cooling structure including the above-mentioned external fan 8 and an internal fan which will be explained later, or a space having a size capable of heat radiation from the conductor bars 7a.

With the use of such a configuration that the conductor bars 7a are projected from the end face of the end ring 7b or 7c as in this embodiment, the heating elements can be made into direct contact with the atmosphere serving as cooling medium, therearound. In addition, the rotation of the conductor bars 7 themselves can further enhance the cooling capacity. The conductor bars 7a possibly increases its temperature up to about 100K owing to some circumstance, and accordingly, it is extremely effective to allow the heating elements to make into direct contact with the cooling medium while they are rotated, for cooling the rotary electric machine.

As a result, since the temperature rise of the rotary electric machine can be reduced, the cooling structure thereof can be simplified, thereby it is possible to make the rotary electric machine itself small-sized.

Figure 4:
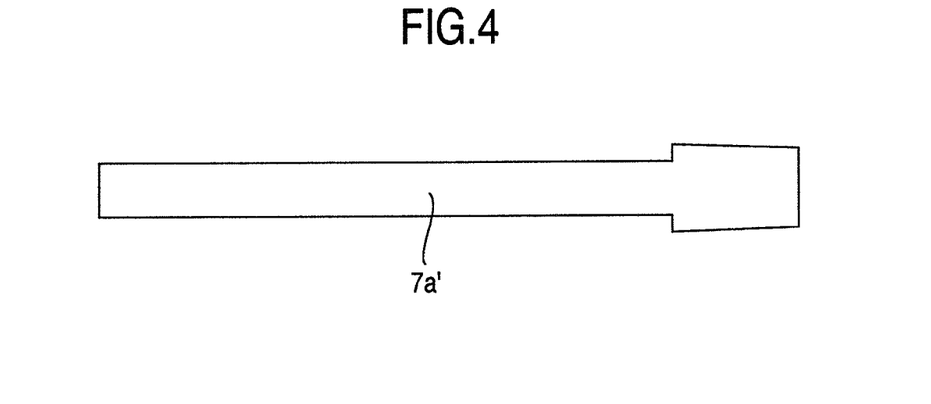
FIG. 4 is a view illustrating conductor bars configured in a shape of an internal fan according to another embodiment of the present invention.
Figure 5:
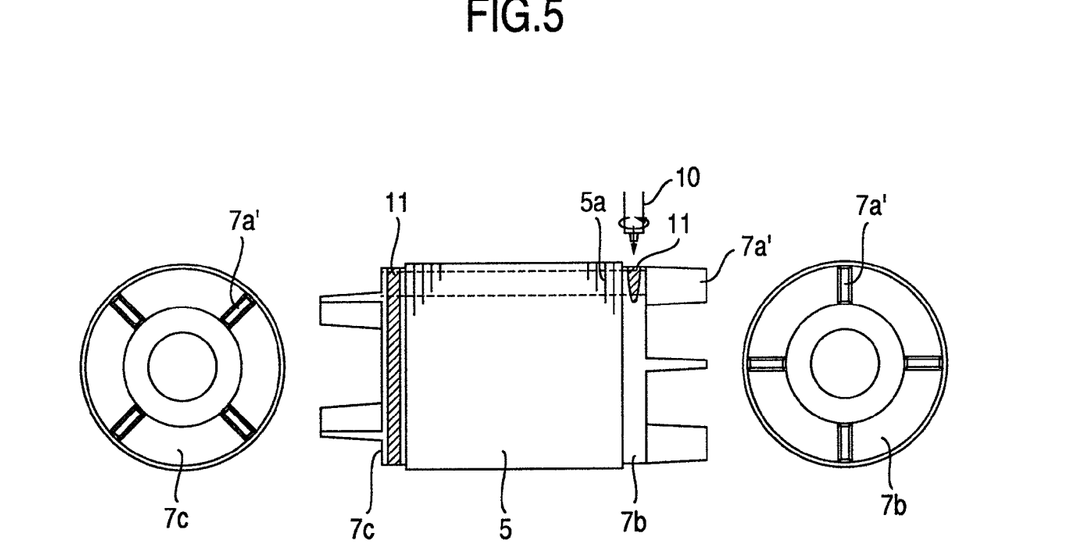
FIG. 5 is a view illustrating a configuration in which the conductor bars shown in FIG. 4 are attached to the rotor.

Next, explanation will be hereinbelow made of another embodiment different from the above-mentioned embodiment, with reference to FIGS. 4 to 6. FIG. 4 is a view which shows a conductor bar having a shape different from that in the above-mentioned embodiment and FIG. 5 is a view which shows a configuration in which the conductor bars shown in FIG. 4 are mounted in a rotor.

Even in this embodiment, similar to the above-mentioned embodiment, the joint tool 10 for carrying out the friction stir welding is inserted from the outer periphery of the end ring 7b or 7c toward the central direction, and accordingly, no restriction is present as to the end face of the end ring 7b or 7c. Accordingly, one end part of the conductor bars is widened as indicated by 7a' so as to enlarge the heat radiation area while it is formed in such a shape that the atmosphere therearound can be agitated (the shape of an internal fan as called in a conventional configuration, which will be referred to as "internal fan shape"), and then, they may be inserted in slots in the rotor 5.

Thus, even though conductor bars 7a' having an internal fan shape which is larger than the hole axially formed in the laminated iron core 5a are used, the conductor bars 7a' are inserted from different directions, and accordingly, there may be present internal fan shapes, in combination, on opposite sides of the laminated iron core 5.

For example, the conduct bars 7a' are inserted alternately from the end ring 7b side and from the end ring 7c side, thereby it is possible to provide parts of the conductor bars 7a' having the internal fan shape at both end faces. That is, as shown in FIG. 5, those having an internal fan shape positioned on one side (the end ring 7b side) of the laminated iron core 5a and those having an internal fan shape positioned on the other side (the end ring 7c side) of the laminated iron core are inserted alternately in opposite directions, thereby it is possible to provide the internal fan shapes of the conductor bars 7a' on both sides.

The end parts of the conductor bars 7a' are formed in the internal fan shape, and thus, the cooling capacity of the conductor bars 7a' serving as heating elements can be further enhanced. As a result, the temperature rise of the rotary electric machine can be reduced, and further, the rotary electric machine can be made to be small-sized.

It is noted here that the end parts of the conductor bars 7a which form the internal fan are located at four positions on the end ring 7b side and at four positions on the end ring 7c side as shown in FIG. 5, but they may be located at any number of positions corresponding to a number of the conductor bars, that is, 12 positions, 18 positions, 22 positions, 28 positions, 32 positions or the like on each of the end ring 7b side and the end ring 7c side, in view of a number of the slots formed in the rotor 5, thereby it is possible to attain an appropriate cooling capacity.

Figure 6:
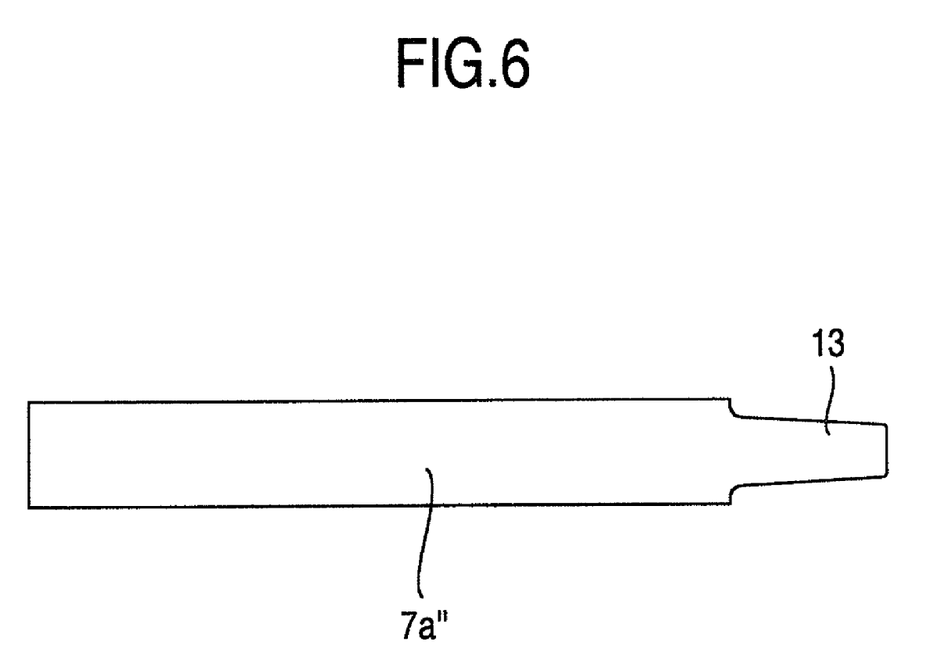
FIG. 6 is a view illustrating a conductor bar having a shape of a protrusion.

Further, a conductor bar 7a" as shown in FIG. 6, has one end part formed as a protrusion 13 which is adapted to be mounted thereto with a balance weight, that is, it may have an effective shape for ensuring a balance for the rotor 5. Specifically, a ring-shaped balance weight is attached to the protrusion 13, and thereafter, the distal end part of the protrusion 13 can be deformed, for functioning as a seat for the balance weight.

The above-mentioned different configurations may be used in combination in the rotor 5, and in particular, in the case of a large number of conductor bars, there may be used necessary configurations at respective positions.

Figure 7:
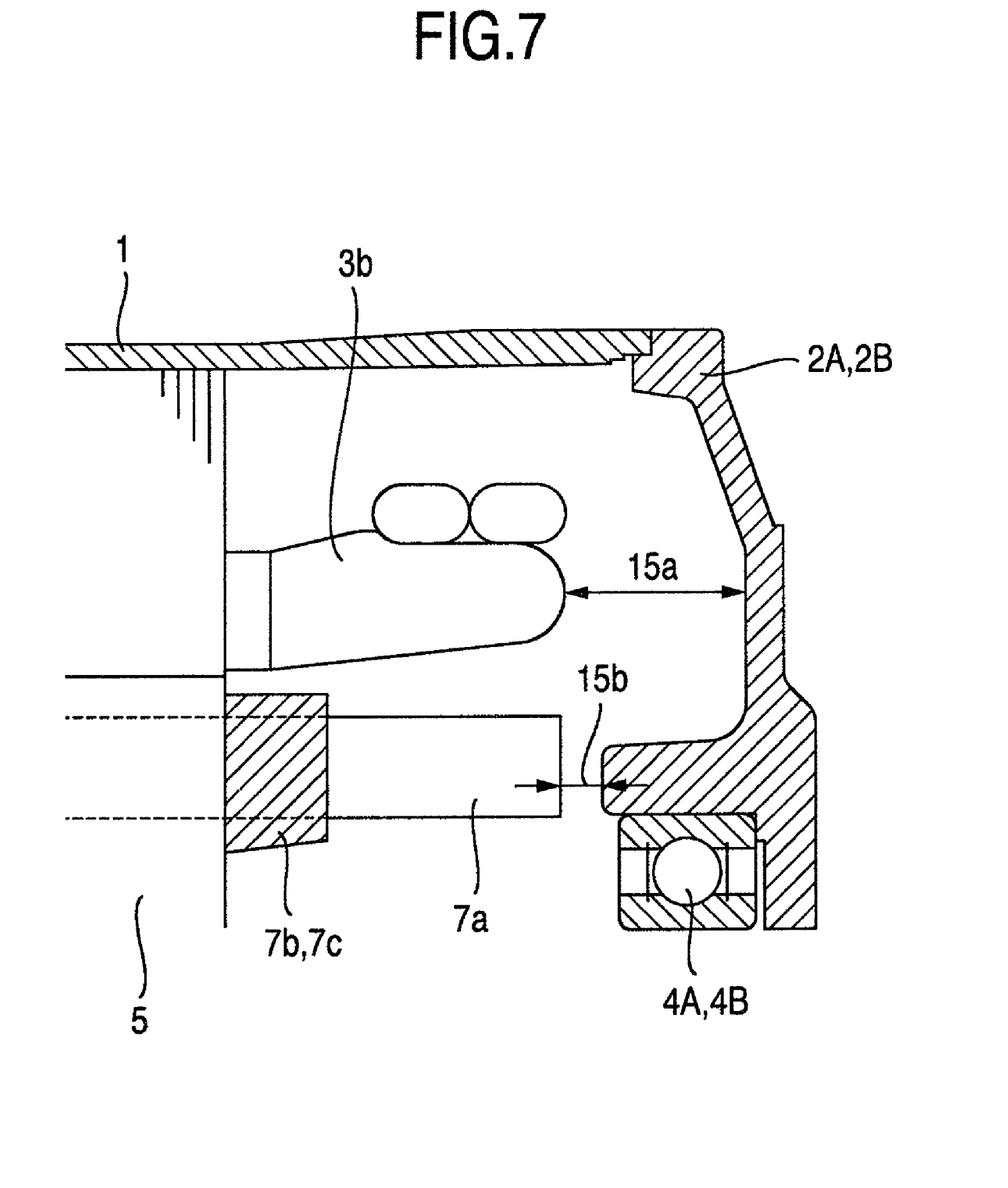
FIG. 7 is a view for explaining an essential part of the rotary electric machine in the embodiment shown in FIG. 1.

Next, explanation will be hereinbelow made of dimensions of the internal component parts of the rotary electric machine shown in FIG. 1, with reference to FIG. 7, which is a view for explaining an essential part in the rotary electric machine. In the rotary electric machine, it is required to sufficiently ensure the gap 15a between the stator coil 3b and the end bracket 2A or 2B and the gap 15b between the conductor bars 7a projected from the rotor 5 and the end bracket 2A or 2B, electrically and structurally, in view of the safety of the rotary electric machine. However, in view of reduction in the size of the rotary electric machine, it is desirable to set these gaps to values as small as possible.

In the configuration of the conductor bar 7a in this embodiment, not only the length of the part of the conductor bar 7a projected from the rotor 5 may be optionally set, but also the distal end part of the conductor bar may have a selected shape capable of enhancing its cooling capacity, as the conductor bar 7a' as stated above. Accordingly, it is possible to ensure an optimum cooling capacity for a size of the stator coil 3b. With the use of the conductor bars having a high cooling capacity as in this embodiment, there may be used such a configuration that the height of projection of the stator coil 3b is adjusted to be substantially equal to that of the conductor bars, as shown in FIG. 7, and further, it is possible to set the height of protection of the conductor bars to be lower than that of the stator coil 3b.

Figure 8:
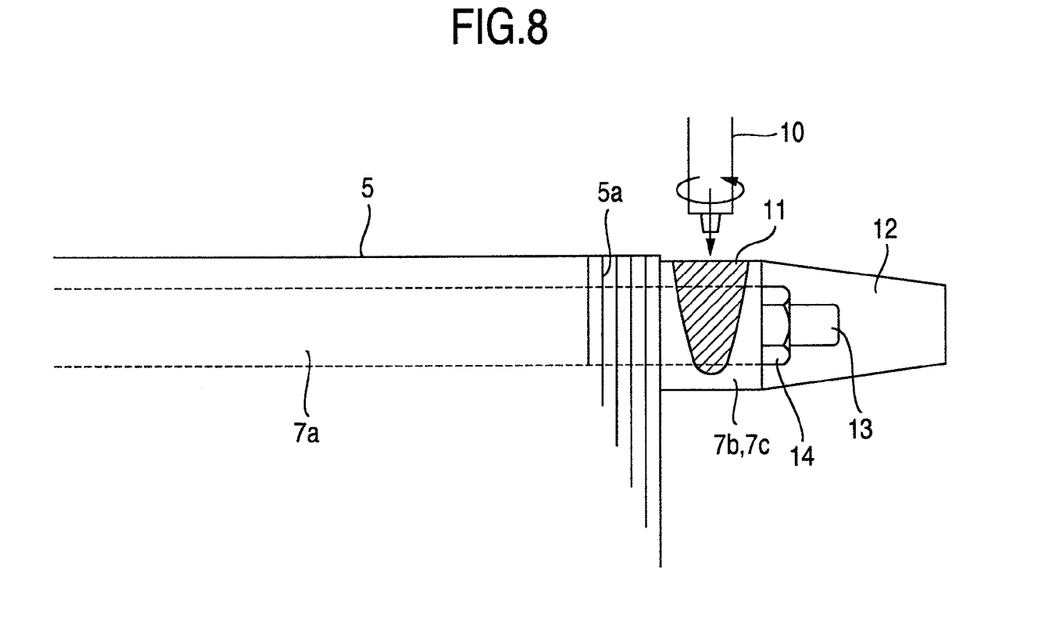
FIG. 8 is a view for explaining an essential part of an embodiment different from the embodiment shown in FIG. 7.

Explanation will be hereinbelow made of an embodiment different from the above-mentioned embodiments, with reference to FIG. 8, which is a view for explaining an essential component part in this embodiment different from the embodiments stated above. In this embodiment, since the joint tool 10 for carrying out friction stir welding is inserted in an outer peripheral direction of the end ring 7b or 7c, similar to those in the afore-mentioned embodiments, no restriction is present as to the end face of the end ring 7b or 7c. Thus, the internal fan 12 for agitating the atmosphere in the rotary electric machine so as to contribute to cooling, and the protrusion 13 for attaching the balance weight 14 for improving a dynamic balance of the rotor 5 may be provided at the end face of the end ring 7b or 7c.

Thus, the internal fan 12 and the protrusion 13 for attaching the balance weight 14 can be formed with no limitation to its design freedom, in accordance with a specification of the rotary electric machine. Thus, the internal fan 12 and the balance weight 14 can be attached, coaxial with the conductor bar, thereby it is possible to ensure a freedom of shapes.

It is noted in the above-mentioned embodiments that the joint part 11 by friction stir welding can be set so as to make the electrical resistance thereof not be increased in electrical joint between the conductor bar 7a and the end ring 7b or 7c, by adjusting the size, the material, the rotational speed and the insertion depth of the joint tool 10 so as to allow the joint part 11 by friction stir welding to be extended over the entire range of the conductor bars 7a in the above-mentioned several embodiments as shown in FIGS. 2, 3, 5 and 8. Accordingly, the mechanical joint therebetween may be sufficient. It is noted that each of the conductor bars may be covered thereover with an insulation film.

In view of the embodiments as stated above, the friction stir welding is carried out at the outer periphery of the end rings 7b, 7c, and accordingly, internal fans having various shapes and members such as seats or protrusions for balance weights may be provided at the end portion of the end ring 7a or 7b, depending upon specifications of products.

During the friction stir welding, it is possible to reduce the hindrance to the workability due to interference of various members provided in the end rings 7b, 7c.

Further, since the conductor bars are projected from the end rings 7b, 7c, heat may be radiated from the conductor bars 7a when the rotor 5 is rotated. As a result, it is possible to reduce the temperature rise of the rotary electric machine.

Accordingly, it is possible to provide a rotary electric machine which can enhance the reliability and the freedom of shapes and restrain the size thereof.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotary electric machine comprising a stator and a rotor opposed to the stator and adapted to be rotated around an axis, said rotor having an iron core formed with a plurality of axial holes, a plurality of conductor bars inserted respectively through said holes, and end rings provided at opposite ends of the conductor bars, wherein friction stir welding is carried out over an entire circumference of an outer peripheral part of said end ring to form a friction stir weld with said conductor bars so that said conductor bars are electrically and mechanically jointed by said end ring friction stir weld which extends over an entire cross-sectional area of said conductor bars, and one end part of said conductor bars is projected from said end ring in the axial direction.

2. The rotary electric machine as set forth in claim 1, wherein an internal fan for agitating atmosphere in said rotary electric machine through the rotation of the rotor, is provided to said end ring.

3. The rotary electric machine as set forth in claim 1, wherein seats or protrusions for attaching balance weights for improving a dynamic balance of said rotor are provided in said end ring or the projected parts of said conductor bars.

4. The rotary electric machine as set forth in claim 1, wherein said conductor bars or said end ring are made of aluminum or aluminum alloy.

5. The rotary electric machine as set forth in claim 1, wherein said conductor bars or said end ring are made of copper or copper alloy.

6. The rotary electric machine as set forth in claim 1, wherein a projection height of said conductor bars from the end ring is set to be equal to or lower than height of a stator coil wound around said stator.

7. The rotary electric machine as set forth in claim 1, wherein end parts of said conductor bars which are projected from said end ring have a shape which is larger than said hole.

8. The rotary electric machine as set forth in claim 7, wherein, of said conductor bars, those inserted in said iron core from one side thereof and those inserted therein from the other side thereof are present in combination, and parts of said conductor bars having a shape larger than said holes are provided on both sides of said iron core.

9. A rotary electric machine comprising a stator and a rotor opposed to the stator and adapted to be rotated around an axis,
said rotor having an iron core formed with a plurality of axial holes, a plurality of conductor bars inserted respectively through said holes, and end rings provided at opposite ends of the conductor bars,
wherein friction stir welding is carried out over an entire circumference of an outer peripheral part of at least one of said end rings to form a friction stir weld with said conductor bars so that said conductor bars are electrically and mechanically jointed to said at least one end ring by said friction stir weld which extends over an entire cross-sectional area of said conductor bars, and
wherein one end part of said conductor bars is projected from said end ring in the axial direction, and a projection height of said conductor bars from the end ring is set to be equal to or lower than height of a stator coil wound around said stator.

* * * * *